June 17, 1958 V. L. HUGHES ET AL 2,839,580
PREPARATION OF DIETHYL KETONE
Filed Jan. 11, 1956
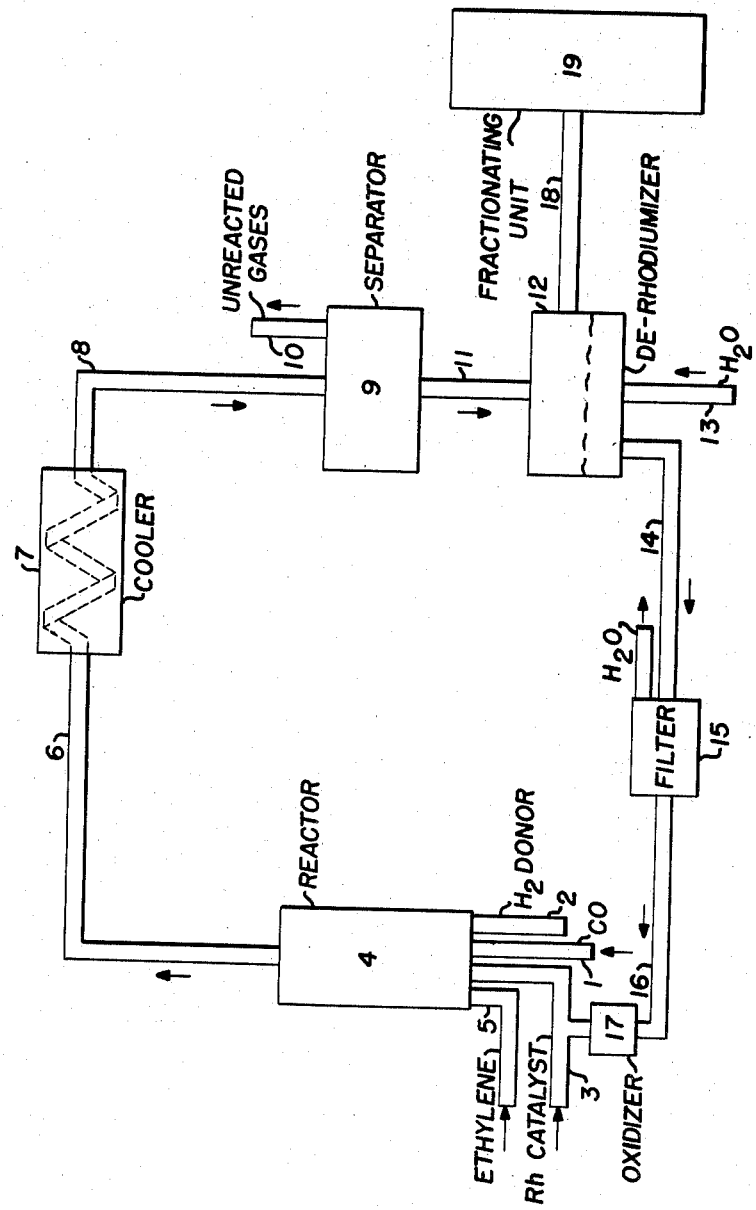
Vincent L. Hughes
Robert S. Brodkey      Inventors
By *Henry Berk*   Attorney

United States Patent Office 2,839,580
Patented June 17, 1958

2,839,580

PREPARATION OF DIETHYL KETONE

Vincent L. Hughes, Clark Township, Union County, and Robert S. Brodkey, Roselle, N. J., assignors to Esso Research and Engineering Company, a corporation of Delaware Application January 11, 1956, Serial No. 558,478

9 Claims. (Cl. 260—597)

The present invention relates to the preparation of diethyl ketone by the reaction between ethylene, carbon monoxide, a hydrogen donor with distinctive catalysis.

Ketones have been commercially prepared by dehydrogenation of secondary alcohols at elevated temperatures over a solid catalyst such as copper, zinc oxide and the like. Since such processes were known to possess several undesirable limitations including the incidental formation of olefins and the unavailability of the necessary secondary alcohol to prepare the desired ketone, it was then proposed to prepare ketones by reacting an olefin with carbon monoxide and a hydrogen donor in the present of a carbonylation catalyst such as cobalt oleate, at elevated temperatures and superatmospheric pressures. It was soon found, however, that the reaction rate was rather slow, yields were comparatively low, and that improved rates could only be obtained by using extremely high temperatures and very high pressures. Obviously, a process requiring high temperatures and pressures would be a very costly method requiring in some instances, special equipment.

It is an important object of the present invention to provide a novel process for the preparation of diethyl ketone from readily available sources and at comparatively low temperatures and pressures.

In accordance with the present invention, it has been found that rhodium and various compounds thereof catalyze the formation of diethyl ketone from an olefin and carbon monoxide in good yields and at high reaction rates under desirable reaction conditions. As the catalyst for this process, rhodium in various forms from elemental to the organic, as well as inorganic salts and oxides, is usable.

It is essential that the catalyst be present as a rhodium-containing material, including elemental rhodium, inorganic or organic rhodium salts which is capable of dissolving in the reaction mixture under the reaction conditions of this process.

Thus, the rhodium-containing catalyst of this invention may include metallic rhodium, rhodium oxides, rhodium chloride, rhodium sulfate, rhodium nitrate, salts of organic acids such as oleic, stearic, etc., and soluble rhodium carbonyls. By carbonyl is meant any rhodium carbonyl, hydrocarbonyl, complex carbonyls or mixtures thereof. By the phrase "capable of dissolving in the reaction mixture" it is meant that the rhodium-containing catalyst must be either added as a product soluble in the reaction mixture under reaction conditions, or that the catalyst may be added as an insoluble material which is converted by reaction or otherwise to a soluble form in the reaction mixture under conditions of reaction.

Rhodium carbonyl may be preformed if desired, in any known manner, such as in the form of solid crystalline material or in a solution of a hydrocarbon diluent such as hexane, and either may be used in the reaction mixture as the catalyst. Rhodium carbonyl may be made by any of the various methods known in the art, among which direct union of carbon monoxide with metallic rhodium or a rhodium salt at high pressures is effective. Rhodium carbonyl takes several forms; e. g., $Rh_2(CO)_8$ $(Rh(CO)_3)_n$ $(Rh_4(CO)_{11})_n$ and $Rh(CO_4)_4H$. All forms of rhodium carbonyl as well as mixtures thereof are suitable catalytic materials for the present reaction, although the individual role of each in the reaction is not known.

Rhodium oxide and chlorides are especially preferred since they are readily converted to compounds which are soluble in the reaction mixture under the reaction conditions of this invention.

Also any of the above rhodium compounds or the metal may be supported on conventional carriers such as alumina, keiselguhr, silica, silica-alumina or any other conventional carrier. The proportion of rhodium or rhodium compound to the carrier is not critical since the catalytic effect is due solely to the amount of rhodium per unit of olefin feed. However, for practical considerations, the rhodium compound when on a support should comprise from about 1% to 40% by weight on metallic rhodium to the carrier, with about 5% being preferred.

In accordance with the present invention, ethylene is reacted with carbon monoxide in the presence of a rhodium-containing catalyst at temperatures of about 100–300° C., and at pressures of about 1500 to 5000 p. s. i. g., to produce a ketone having one more than twice the number of carbon atoms of the original olefin. This reaction is carried out in the presence of a hydrogen donor. A hydrocarbon diluent or solvent for the olefin, of the type generally used in the conventional carbonylation reaction such as n-hexane, etc., may be employed. The particular hydrogen donor used in the present process may be any hydrogen donor known to be effective in this type of reaction. It is to be understood that the term "hydrogen donor" as used herein, means any compound which liberates hydrogen under the conditions of reaction and wherein said compound is thereby dehydrogenated. Preferred hydrogen donors for this reaction includes the secondary alcohols such as isopropanol, the isobutanols, pentanol-2, octanol-3 and generally $C_3$ to $C_{10}$ secondary alcohols. Examples of other hydrogen donors are isoparaffins, certain substituted multiple ring, or partially hydrogenated multiple ring aromatic hydrocarbons and naphthenes. Certain other aromatic hydrocarbons with hydrocarbonaceous substituents, such as toluene, xylenes and ethyl benzene may require the further addition of small amounts of hydrogenation catalysts, such as nickel and copper.

In general, it is preferred to use isopropyl alcohols as the hydrogen donor since acetone, the resulting dehydrogenated product, would be economically desirable to recover from the reaction. However, the recovered acetone may be hydrogenated if desired to convert it to the alcohol, to be recycled to the primary reaction zone.

The present process is amenable to batch type, semicontinuous or continuous operations. For a more complete and better understanding of the process, reference may be had to the drawing wherein a flow diagram of a continuous process is illustrated.

In accordance with one embodiment of the present invention of which the drawing is a flow plan, ethylene is passed to a reaction zone 4, through line 5. If desired, the ethylene may be dissolved in a conventional diluent solvent such as n-hexane, hydrogen donor liquid, or other solvents previously mentioned. Carbon monixide is passed into the reactor 4, through line 1, and the hydrogen donor liquid through line 2. As the carbonylation catalyst, rhodium-containing substance, preferably a rhodium oxide, may be added via line 3 in amounts from about 0.01 to 0.5 wt. percent calculated as metal based on ethylene via line 5. Within the reactor 4, a temperature of about 100° to 300° C. may be maintained but preferably temperatures within the range of from 150° to 250° C. are employed. The pressures maintained should be at least about 1500 p. s. i. g., and preferably from 3000 to 5000 p. s. i. g. The rate of flow of gas and olefins is so regulated that the desired conversion level of olefin is obtained. These conditions include an olefin fresh feed rate of about 0.1 to 10 v./v./hr., a CO feed rate of 1000 to 4000 cu. ft./bbl. of olefin, a ratio of about 1 to 5 mols of hydrogen donor per mole of olefin and the residence period of about 0.1 to 10 hours. Reaction product is drawn overhead through line 6 and is passed through cooler 7 and then via line 8 to a high pressure separator 9 from which unreacted gases are withdrawn overhead through line 10. Reaction product containing a large concentration of rhodium carbonyl is passed via line 11 to de-rhodiumizer unit 12 where by injection of 5 to 40% water in vapor or liquid form at 13, at elevated temperatures below about 200° C., the soluble rhodium catalyst is converted to an insoluble rhodium-containing precipitate. By "de-rhodiumizer" is meant any zone wherein the rhodium is separated from the ketone product mixer. Two layers will form in the unit 12, the bottom aqueous layer containing substantially all of the rhodium as insoluble matter. The aqueous layer containing precipitated rhodium may be separated as a bottom layer from the liquid product via line 14 and decanted or filtered, etc., at 15, and the precipitated rhodium preferably in the form of an organic slurry may be returned to the primary reactor 4 via line 16. Alternatively, the rhodium slurry may first be passed through an oxidizing unit 17 to insure all of the rhodium being converted to the highly active and preferred oxide.

In the process of removing rhodium from the product or de-rhodiumizing, it is generally preferred to add from about 5% to 40% by volume water at 120° to 200° C., although temperatures as low as 80° C. and higher than 200° C. are operable. Similarly, up to one volume and more of water per volume of product may be employed, however, these larger quantities present some problems with respect to handling the mixture. Oxidation of the rhodium-containing precipitate may be carried out by any conventional oxidation technique such as by passing air over the precipitate at elevated temperatures; e. g., 400° C.

The reaction product comprising diethyl ketone, unreacted hydrogen donor and unsaturated compounds such as aromatics corresponding to the hydrogen donor after loss of hydrogen, or ketone corresponding to the secondary alcohol after loss of hydrogen is withdrawn through line 18 and passed into a distillation or recovery unit 19. The entire organic product from the de-rhodiumizing zone may be led to a distillation zone 19, wherein the end products are fractionated and recovered in accordance with their respective boiling points in a manner known in the art. Some of the product may be recycled to the primary reactor 4, if desired. The spent hydrogen donor from the distillation zone 19 may be led to a hydrogenator wherein this compound may be reconverted to the hydrogenated form and recycled in its reactive form. If, for example, isopropyl alcohol is used, the resulting acetone will preferably be recovered as such.

Other modifications which come within the scope of the present invention are readily seen. For example, unreacted hydrogen donor which is recovered at the distillation unit 19 may be recycled to the primary reactor 4. Also, the rhodium-containing catalyst recovered from unit 12 may be recycled as an aqueous or organic slurry, or as a solid. It is to be understood that any of the reactants or the catalyst may be introduced into the reactor at various suitable points.

The process of the present invention may be further illustrated by the following examples.

In Table I, there are shown data accumulated from an embodiment of the present comparing the effectiveness of rhodium-containing catalysts in the preparation of diethyl ketone.

TABLE I

[T=175° C. 3,500 p. s. i. g. total pressure. 753 gms. isopropyl alcohol.]

| Catalyst | Wt. Percent/Olefin [1] | Moles Ethylene | Time of Reaction, hrs. | Percent Conversion | Mole Percent/Hr. | Rel. Rate |
|---|---|---|---|---|---|---|
| cobalt oleate | 2.0 | 2.55 | 22 | 59.6 | 2.7 | 1 |
| rhodium sesquioxide | 0.175 | 6.0 | 5.5 | 98 | 18.0 | 6.7 |

[1] Calculated as metal.

*Example I*

1000 cc. of isopropyl alcohol were placed in a 3-liter high pressure reactor. At 40° C., 1300 pounds (6.0 moles) of ethylene and carbon monoxide were charged to the reactor at 700 p. s. i. g. The temperature was raised to 175° C. and the pressure maintained at 3500 p. s. i. g., by the addition of carbon monoxide for 6 hours at which time all gas uptake had ceased. The reactor was then cooled and the pressure reduced to atmospheric.

To remove the catalyst, 250 cc. of water were pumped into the reactor and the temperature raised to 150° C. for two hours. After the product was cooled, the precipitated rhodium was recovered by filtration suitable for reuse.

Some of the product was fractionated and analyzed as follows:

| Material | 748 gms. of product—Quantity, gms. | Selectivity; Percent |
|---|---|---|
| Acetone | 126 | |
| Diethyl Ketone | 170 | 90 |
| Propionaldehyde | 13 | 10 |
| Unreacted IPOH | 396 | |
| Bottoms | 43 | |

The above data clearly show the unexpected and superior results achieved in the conversion of ethylene to diethyl ketone with a hydrogen donor and a rhodium-containing catalyst as compared to cobalt as a catalyst. It will be seen that relatively minor amounts of rhodium-containing catalyst are required as compared to the cobalt catalyst. With a rhodium-containing catalyst, the time of reaction is considerably less, the amount of conversion is considerably greater and the relative reaction rate is markedly increased as compared to the same process with a cobalt catalyst. A comparative run using a rhodium-containing catalyst at 150° C. gave only trace amounts of propionaldehyde, but a considerably lower reaction rate; e. g., 5 mol percent/hr. was obtained. The superior results achieved with the use of rhodium containing catalysts over cobalt catalyst are manifested particularly at low temperatures with the range of about 150° to 250° C.

What is claimed is:

1. A process of preparing diethyl ketone which comprises reacting ethylene, carbon monoxide and a hydrogen donor in the presence of a catalytic amount of a rhodium-containing catalyst capable of being dissolved in the reaction mixture under the conditions of reaction, said conditions of reaction including a temperature of about 100° to 300° C., and pressures of about 1500 to 5000 p. s. i. g., and recovering diethyl ketone in good yields.

2. The process of claim 1 wherein the hydrogen donor is isopropyl alcohol.

3. The process of claim 2 wherein the catalyst calculated as the metal is present in an amount from about 0.01 to 0.5 weight percent based on the ethylene.

4. The process of claim 3 wherein the catalyst is rhodium sesquioxide.

5. A process of preparing diethyl ketone and acetone which comprises reacting ethylene, carbon monoxide and isopropyl alcohol in the presence of a rhodium-containing catalyst at temperatures of about 100° to 300° C. and pressures between about 1500 to 5000 p. s. i. g., separating unreacted gases from the product mixture, adding water to the thus gas freed product mixture at elevated temperatures to remove substantially all of the rhodium as a precipitate, distilling the resulting organic layer containing diethyl ketone and acetone and recovering said compounds.

6. The process of claim 5 wherein the recovered rhodium from the reaction mixture is recycled to the primary reaction zone.

7. The process in accordance with claim 6 wherein rhodium sesquioxide is the catalyst.

8. A continuous process of preparing diethyl ketone which comprises passing ethylene, carbon monoxide, a hydrogen donor and a rhodium-containing catalyst into a reaction zone, maintaining temperatures in said zone between 100° to 300° C., and pressures between 1500 and 5000 p. s. i. g., for a period of time sufficient to form a substantial amount of diethyl ketone, cooling the product obtained, separating unreacted gases therefrom, contacting the organic product with water at elevated temperatures to precipitate substantially all of the rhodium therefrom and fractionating the thus rhodium freed product mixture to obtain diethyl ketone.

9. A process in accordance with claim 8 wherein the rhodium precipitate is recycled to the reaction zone as an active catalyst therefor.

References Cited in the file of this patent

UNITED STATES PATENTS

| | | |
|---|---|---|
| 2,327,066 | Roelen | Aug. 17, 1943 |
| 2,473,995 | Gresham et al. | June 21, 1949 |
| 2,526,742 | Gresham et al. | Oct. 24, 1950 |